US010782696B2

(12) United States Patent
Vance et al.

(10) Patent No.: US 10,782,696 B2
(45) Date of Patent: Sep. 22, 2020

(54) MOBILE FIXTURE APPARATUSES AND METHODS

(71) Applicant: THE BOEING COMPANY, Chicago, IL (US)

(72) Inventors: Jonathan B. Vance, Webster Groves, MO (US); Andrew Joseph Martignoni, III, Collinsville, IL (US); Brian M. Finn, St. Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 94 days.

(21) Appl. No.: 16/125,246

(22) Filed: Sep. 7, 2018

(65) Prior Publication Data

US 2020/0081438 A1   Mar. 12, 2020

(51) Int. Cl.
*G06F 7/00* (2006.01)
*G05D 1/02* (2020.01)
*B25J 15/00* (2006.01)

(52) U.S. Cl.
CPC ............ *G05D 1/0212* (2013.01); *B25J 15/00* (2013.01); *G05D 2201/0216* (2013.01)

(58) Field of Classification Search
None
See application file for complete search history.

(56) References Cited

U.S. PATENT DOCUMENTS

| 4,006,650 | A | 2/1977 | Elmer |
| 4,108,566 | A | 8/1978 | Jones |
| 4,148,401 | A | 4/1979 | Kautetzky |
| 4,445,588 | A | 5/1984 | Truninger |
| 4,477,216 | A | 10/1984 | Van De Matter et al. |
| 4,483,080 | A | 11/1984 | Knoll |

(Continued)

FOREIGN PATENT DOCUMENTS

| CA | 25537471 A1 | 8/2005 |
| CA | 2497249 A1 | 8/2006 |

(Continued)

OTHER PUBLICATIONS

Final Office Action, dated Oct. 2, 2017, regarding U.S. Appl. No. 14/559,034, 21 pages.

(Continued)

*Primary Examiner* — Yolanda R Cumbess
(74) *Attorney, Agent, or Firm* — Joseph F. Harding; The Small Patent Law Group LLC

(57) ABSTRACT

A mobile fixture includes a movable base, a support platform, an adaptor interface, at least one sensor, and a controller. The movable base is configured to travel over a floor. The support platform is articulable with respect to the base. The adaptor interface moves with the support platform, and is configured to mechanically interface with an attachment member. The at least one sensor is coupled to the adaptor interface and is configured to detect at least one of a force or movement resulting from an interaction between the adaptor interface and the attachment member. The controller is operably coupled to the movable base, support platform, and at least one sensor, and is configured to control movement of at least one of the movable base or support platform responsive to the at least one of the force or movement detected by the at least one sensor.

17 Claims, 7 Drawing Sheets

(56) References Cited

U.S. PATENT DOCUMENTS

| | | | |
|---|---|---|---|
| 4,599,018 A | 7/1986 | Woods | |
| 4,674,949 A | 6/1987 | Kroczynski | |
| 4,710,086 A | 12/1987 | Naaktgeboren et al. | |
| 4,781,517 A | 11/1988 | Pearce et al. | |
| 4,850,763 A | 7/1989 | Jack et al. | |
| 4,885,836 A | 12/1989 | Bonomi et al. | |
| 4,940,382 A | 7/1990 | Castelain et al. | |
| 4,995,146 A | 2/1991 | Woods | |
| 5,022,542 A | 6/1991 | Beier | |
| 5,150,506 A | 9/1992 | Kotake et al. | |
| 5,203,855 A | 4/1993 | Givler et al. | |
| 5,210,935 A | 5/1993 | Givler | |
| 5,213,454 A | 5/1993 | Givler et al. | |
| 5,216,819 A | 6/1993 | Givler | |
| 5,231,747 A | 8/1993 | Clark et al. | |
| 5,231,754 A | 8/1993 | Givler | |
| 5,259,104 A | 11/1993 | Givler | |
| 5,263,236 A | 11/1993 | Givler | |
| 5,326,201 A | 7/1994 | King | |
| 5,351,626 A | 10/1994 | Yanagisawa | |
| 5,390,128 A | 2/1995 | Ryan et al. | |
| 5,407,415 A | 4/1995 | Spishak | |
| 5,419,268 A | 5/1995 | Fyler et al. | |
| 5,468,099 A | 11/1995 | Wheetley et al. | |
| 5,524,180 A | 6/1996 | Wang et al. | |
| 5,526,203 A | 6/1996 | Mohajerani et al. | |
| 5,564,655 A | 10/1996 | Garland et al. | |
| 5,646,870 A | 7/1997 | Krivokapic et al. | |
| 5,653,351 A | 8/1997 | Grout et al. | |
| 5,657,429 A | 8/1997 | Wang et al. | |
| 5,709,026 A | 1/1998 | Veselaski et al. | |
| 5,715,729 A | 2/1998 | Toyama et al. | |
| 5,761,064 A | 6/1998 | La et al. | |
| 5,822,877 A | 10/1998 | Dai | |
| 5,848,859 A | 12/1998 | Clark et al. | |
| 5,910,894 A | 6/1999 | Pryor | |
| 5,920,394 A | 7/1999 | Gelbart et al. | |
| 6,098,260 A | 8/2000 | Sarh | |
| 6,120,084 A | 9/2000 | Wieczorek | |
| 6,230,382 B1 | 5/2001 | Cunningham et al. | |
| 6,299,118 B1 | 10/2001 | Farrell | |
| 6,779,272 B2 | 8/2004 | Day et al. | |
| 6,843,328 B2 | 1/2005 | Boyl Davis et al. | |
| 6,862,912 B2 | 3/2005 | Olsson | |
| 6,871,524 B2 | 3/2005 | Olsson | |
| 6,926,094 B2 | 8/2005 | Arntson et al. | |
| 6,961,626 B1 | 11/2005 | Paik | |
| 7,168,898 B2 | 1/2007 | Hamann | |
| 7,249,943 B2 | 7/2007 | Benson et al. | |
| 7,273,333 B2 | 9/2007 | Buttrick, Jr. et al. | |
| 7,406,758 B2 | 8/2008 | Jones et al. | |
| 7,614,154 B2 | 11/2009 | Cobb | |
| 8,005,563 B2 | 8/2011 | Cobb et al. | |
| 8,539,658 B2 | 9/2013 | Munk | |
| 8,606,388 B2 | 12/2013 | Cobb et al. | |
| 8,620,470 B2 | 12/2013 | Cobb et al. | |
| 8,661,684 B1 | 3/2014 | Boyd et al. | |
| 8,763,953 B2 | 7/2014 | Sakurai et al. | |
| 8,790,050 B2 | 7/2014 | Marguet et al. | |
| 9,090,357 B2 | 7/2015 | Oberoi et al. | |
| 9,205,933 B2 | 12/2015 | Oberoi et al. | |
| 9,299,118 B1 | 3/2016 | McGraw | |
| 9,486,917 B2 | 11/2016 | Reid et al. | |
| 9,708,079 B2 | 7/2017 | DesJardien et al. | |
| 10,155,367 B2 | 12/2018 | Crothers et al. | |
| 2002/0066192 A1 | 6/2002 | Cunningham et al. | |
| 2002/0133661 A1 | 9/2002 | Suzuki et al. | |
| 2003/0043964 A1 | 3/2003 | Sorenson | |
| 2003/0097198 A1 | 5/2003 | Sonderman et al. | |
| 2003/0149502 A1 | 8/2003 | Rebello et al. | |
| 2004/0039465 A1 | 2/2004 | Boyer | |
| 2005/0036879 A1 | 2/2005 | Jhaveri et al. | |
| 2005/0049126 A1 | 3/2005 | Everson et al. | |
| 2005/0172470 A1 | 8/2005 | Cobb et al. | |
| 2005/0223549 A1 | 10/2005 | Braun | |
| 2007/0029877 A1 | 2/2007 | Longley | |
| 2007/0180674 A1 | 8/2007 | Morden et al. | |
| 2008/0077276 A1 | 3/2008 | Montero Sanjuan et al. | |
| 2008/0155807 A1 | 7/2008 | Toh et al. | |
| 2008/0205763 A1 | 8/2008 | Marsh et al. | |
| 2009/0112349 A1 | 4/2009 | Cobb et al. | |
| 2009/0297316 A1 | 12/2009 | Wells et al. | |
| 2010/0025349 A1 | 2/2010 | Khoshnevis | |
| 2010/0151364 A1 | 6/2010 | Ye et al. | |
| 2010/0180711 A1 | 6/2010 | Kilibarda et al. | |
| 2010/0204817 A1 | 8/2010 | Fujita | |
| 2010/0217437 A1 | 8/2010 | Sarh et al. | |
| 2010/0316469 A1* | 12/2010 | Lert | B65G 1/0492 414/273 |
| 2011/0010007 A1 | 1/2011 | Sarh et al. | |
| 2011/0054694 A1 | 5/2011 | Munk | |
| 2011/0132548 A1 | 6/2011 | De Mattia | |
| 2011/0178727 A1 | 7/2011 | Hafenrichter et al. | |
| 2011/0214586 A1 | 9/2011 | Wessel et al. | |
| 2012/0014759 A1 | 1/2012 | Sarh et al. | |
| 2012/0210802 A1 | 8/2012 | Sarh et al. | |
| 2013/0014368 A1 | 1/2013 | Woods et al. | |
| 2013/0018525 A1 | 1/2013 | Jang et al. | |
| 2013/0145850 A1 | 6/2013 | Lute, Jr. et al. | |
| 2013/0152397 A1 | 6/2013 | Oberoi et al. | |
| 2013/0158697 A1* | 6/2013 | Stone | B25J 9/1682 700/114 |
| 2013/0226340 A1 | 8/2013 | Buchstab | |
| 2013/0289766 A1 | 10/2013 | Hafenrichter et al. | |
| 2014/0115860 A1 | 5/2014 | Sarh et al. | |
| 2014/0157588 A1 | 6/2014 | Boyd et al. | |
| 2014/0277717 A1 | 9/2014 | Jung | |
| 2014/0305217 A1 | 10/2014 | Tapia et al. | |
| 2014/0340509 A1 | 11/2014 | Fairbairn | |
| 2015/0314888 A1 | 11/2015 | Reid et al. | |
| 2015/0314890 A1 | 11/2015 | DesJardien et al. | |
| 2016/0023355 A1 | 1/2016 | Komatsu et al. | |
| 2016/0327383 A1* | 11/2016 | Becker | G01B 11/005 |
| 2017/0182759 A1 | 6/2017 | Crothers et al. | |
| 2018/0095467 A1* | 4/2018 | Perrone | B25J 9/1661 |
| 2019/0374966 A1* | 12/2019 | Thompson | B05B 12/124 |
| 2020/0079531 A1* | 3/2020 | Vance | B25J 9/1682 |

FOREIGN PATENT DOCUMENTS

| | | |
|---|---|---|
| DE | 102008041190 A1 | 3/2010 |
| EP | 1227316 A2 | 11/2002 |
| EP | 1884453 A2 | 2/2008 |
| EP | 2108515 A1 | 10/2009 |
| EP | 2221151 A2 | 6/2010 |
| EP | 2604524 A2 | 6/2013 |
| EP | 2631041 A2 | 8/2013 |
| EP | 2792431 A1 | 10/2014 |
| EP | 2913731 A1 | 9/2015 |
| EP | 2939933 A1 | 11/2015 |
| EP | 2604524 A3 | 5/2016 |
| GB | 2095215 A | 9/1982 |
| GB | 2329138 A | 3/1999 |
| GB | 2473100 A | 3/2011 |
| GB | 2498977 A | 8/2013 |
| WO | 2010018340 A2 | 2/2010 |
| WO | 2012088924 A1 | 7/2012 |
| WO | 2014193602 A2 | 2/2014 |

OTHER PUBLICATIONS

Notice of Allowance, dated Jan. 17, 2018, regarding U.S. Appl. No. 14/559,034, 13 pages.

Office Action, dated Jun. 13, 2017, regarding U.S. Appl. No. 14/558,834, 39 pages.

Final Office Action, dated Oct. 3, 2017, regarding U.S. Appl. No. 14/558,834, 12 pages.

Office Action, dated Mar. 4, 2016, regarding U.S. Appl. No. 14/558,850, 24 pages.

Office Action. dated Nov. 10, 2018, regarding U.S. Appl. No. 14/558,850, 23 pages.

Final Office Action, dated Aug. 2, 2016, regarding U.S. Appl. No. 14/558,850, 33 pages.

(56) References Cited

OTHER PUBLICATIONS

Notice of Allowance, dated Apr. 24, 2017, regarding U.S. Appl. No. 14/558,850, 11 pages.
Office Action, dated May 12, 2016 regarding U.S. Appl. No. 14/558,859, 27 pages.
Notice of Allowance, dated Jul. 7, 2015, regarding U.S. Appl. No. 14/558,859, 29 pages.
Office Action, dated May 12, 2015, regarding U.S. Appl. No, 14/558,899, 35 pages.
Office Action, dated Nov. 17, 2016, regarding U.S. Appl. No. 14/558,899, 36 pages.
Notice of Allowance, dated Feb. 27, 2017, regarding U.S. Appl. No. 14/558,899, 13 pages.
Extended European Search Report, dated May 2, 2018, regarding Application No. EP14196468.4, 7 pages.
Extended European Search Report, dated Jan. 27, 2016, regarding Application No. EP14196480.9, 9 pages.
Partial European Search Report, dated Sep. 30, 2015, regarding Application No. EP14196480.9, 5 pages.
Extended European Search Report, dated May 2, 2016, regarding Application No. EP14196483.3, 7 pages.
Extended European Search Report, dated Apr. 8, 2018, regarding Application No. EP14196494.0, 6 pages.
Extended European Search Report, dated May 3, 2016, regarding Application No. EP14196548.3, 7 pages.
Extended European Search Report, dated Sep. 22, 2015, regarding Application No. EP14196571.5, 8 pages.
Extended European Search Report, dated Oct. 2, 2015, regarding Application No. EP14196553.3, 7 pages.
Office Action, dated May 3, 2017, regarding U.S. Appl. No. 14/559,034, 55 pages.
Extended European search report dated Jan. 31, 2020 for corresponding European Application No. 19194323.2 (6 pages).
Final Office Action dated Mar. 29, 2019 for corresponding U.S. Appl. No. 16/125,198.

* cited by examiner

MOBILE FIXTURE APPARATUSES AND METHODS

FIELD OF EMBODIMENTS OF THE DISCLOSURE

Embodiments of the present disclosure generally relate to mobile fixtures, such as for positioning and/or transporting parts or assemblies during manufacturing and/or assembly processes.

BACKGROUND OF THE DISCLOSURE

Mobile fixtures may be used to move large parts or assemblies. The mobile fixtures may be used in groups to support and position the parts or assemblies. However, certain conventional approaches utilize groups of mobile fixtures that are each communicatively coupled to a network that provides control signals and/or communicably coupled to each other to receive control signals. These approaches may be inefficient and/or inconvenient to program and control. For example, such approaches tend to be very application-specific, and do not lend themselves to re-purposing mobile fixtures for other work flows or products. As another example, some approaches rely heavily upon integrated metrology systems, requiring networked communications.

SUMMARY OF THE DISCLOSURE

A need exists for improved control and operation of mobile fixtures, for example groups of mobile fixtures cooperatively used to transport or position a common part or assembly.

With those needs in mind, certain embodiments of the present disclosure provide a mobile fixture system that includes a plurality of mobile fixtures. Each mobile fixture includes a movable base, a support platform, an adaptor interface, at least one sensor, and a controller. The movable base is configured to travel over a floor. The support platform is coupled to the movable base and is articulable with respect to the movable base. The adaptor interface is coupled to and moves with the support platform, and is configured to mechanically interface with an attachment member. The at least one sensor is coupled to the adaptor interface, and is configured to detect at least one of a force or movement resulting from an interaction between the adaptor interface and the attachment member. The controller is operably coupled to the movable base, support platform, and at least one sensor. The controller is configured to control movement of at least one of the movable base or support platform responsive to the at least one of the force or movement detected by the at least one sensor. Each of the mobile fixtures is configured to concurrently engage a different portion of the attachment member via the corresponding adaptor interface, wherein the mobile fixtures are operably coupled to each other via the attachment member.

Certain embodiments of the present disclosure provide a method that includes providing a plurality of mobile fixtures, with each mobile fixture including a movable base configured to travel over a floor; a support platform coupled to the movable base and articulable with respect to the base; an adaptor interface coupled to and moving with the support platform, the adaptor interface configured to mechanically interface with an attachment member; at least one sensor coupled to the adaptor interface and configured to detect at least one of a force or movement resulting from an interaction between the adaptor interface and the attachment member; and a controller operably coupled to the movable base, support platform, and at least one sensor, the controller configured to control movement of at least one of the movable base or support platform responsive to the at least one of the force or movement detected by the at least one sensor. The method also includes engaging a different portion of the attachment member with each of the mobile fixtures via the corresponding adaptor interface, wherein the mobile fixtures are operably coupled to each other via the attachment member. Also, the method includes sensing, with the at least one sensor coupled to the adaptor interface of at least one of the mobile fixtures, at least one of a force or movement resulting from an interaction between the adaptor interface and the attachment member. Further, the method includes controlling, autonomously, movement of the at least one of the movable base or support platform of the corresponding at least one of the mobile fixtures responsive to the at least one of the force or movement detected by the at least one sensor.

Certain embodiments of the present disclosure provide a mobile fixture controller that is configured to control operation of a mobile fixture that includes a movable base configured to travel over a floor, a support platform coupled to the movable base and articulable with respect to the base, an adaptor interface coupled to and moving with the support platform, with the adaptor interface configured to mechanically interface with an attachment member, and at least one sensor coupled to the adaptor interface. The mobile fixture controller is configured to be operably coupled to the movable base, support platform, and at least one sensor, and to receive an input from the at least one sensor corresponding to at least one of a force or movement resulting from an interaction between the adaptor interface and the attachment member; determine a planned movement of at least one of the movable base or the support platform to address the detected at least one of the force or movement; and control movement of the at least one of the movable base or support platform responsive to the at least one of the force or movement detected by the at least one sensor pursuant to the planned movement.

Certain embodiments of the present disclosure provide a method that includes articulating a support platform of a mobile fixture with respect to a movable base of the mobile fixture. The method also includes coupling an adaptor interface of the mobile fixture to an attachment member. The adaptor interface is coupled to and moves with the support platform of the mobile fixture, and the support platform is coupled to the movable base of the mobile fixture. Further, the method includes sensing, with at least one sensor coupled to the adaptor interface, at least one of a force or movement resulting from an interaction between the adaptor interface and the attachment member. The method also includes controlling, with a controller, movement of at least one of the movable base or support platform responsive to the at least one of the force or movement detected by the at least one sensor.

Certain embodiments of the present disclosure provide a mobile fixture that includes a movable base, a support platform, an adaptor interface, at least one sensor, and a controller. The movable base is configured to travel over a floor. The support platform is coupled to the movable base and is articulable with respect to the base. The adaptor interface is coupled to and moves with the support platform, and is configured to mechanically interface with an attachment member. The at least one sensor is coupled to the adaptor interface and is configured to detect at least one of a force or movement resulting from an interaction between the adaptor interface and the attachment member. The controller is operably coupled to the movable base, support platform, and at least one sensor, and is configured to control movement of at least one of the movable base or support platform responsive to the at least one of the force or movement detected by the at least one sensor, Certain embodiments of the present disclosure provide a method that includes providing a mobile fixture. The mobile fixture includes a movable base configured to travel over a floor; a support platform coupled to the movable base and articulable with respect to the movable base; an adaptor interface coupled to and moving with the support platform, the adaptor interface configured to mechanically interface with an attachment member; at least one sensor coupled to the adaptor interface and configured to detect at least one of a force or movement resulting from an interaction between the adaptor interface and the attachment member; and a controller operably coupled to the movable base, support platform, and at least one sensor, the controller configured to control movement of at least one of the movable base or support platform responsive to the at least one of the force or movement detected by the at least one sensor. The method also includes engaging a portion of the attachment member with the mobile fixture via the corresponding adaptor interface, wherein the attachment member is operably coupled to another mobile fixture. Further, the method includes sensing, with the at least one sensor coupled to the adaptor interface of the mobile fixture, at least one of a force or movement resulting from movement of the attachment member. Also, the method includes controlling, autonomously, movement of the at least one of the movable base or support platform of the corresponding at least one of the mobile fixtures responsive to the at least one of the force or movement detected by the at least one sensor.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments of the present disclosure utilize a distributed control strategy for a team of independent robots (mobile fixtures). For example, a part or assembly may be mechanically supported and transported by a team of robots. The robots are mechanically independent and provide coordinated material handling utilizing force feedback to determine control inputs to move a part or assembly supported by multiple robots. Optionally, pose of the part or assembly may be maintained. Control strategies disclosed herein facilitate hand-guiding large parts or assemblies using a team of robotic fixtures. It may be noted that in various embodiments one or more mobile fixtures may work in conjunction with one or more fixed or stationary fixture or other component(s).

Various embodiments of the present disclosure make it possible to support and transport large or unwieldy parts or assemblies (e.g., fuselage or flight hardware for an aircraft) in a manufacturing environment using teams of independent multiple degree-of-freedom robots (mobile fixtures). Robust mobile robotic systems are utilized as assembly fixtures and conveyances. Various embodiments utilize control systems and methodologies discussed herein to enable movement of whole flight hardware parts assemblies using hand guidance (e.g., manual inputs). Additionally, various embodiments provide leader and follower material handling robot systems without the use of traditional data networking.

Figure 1:
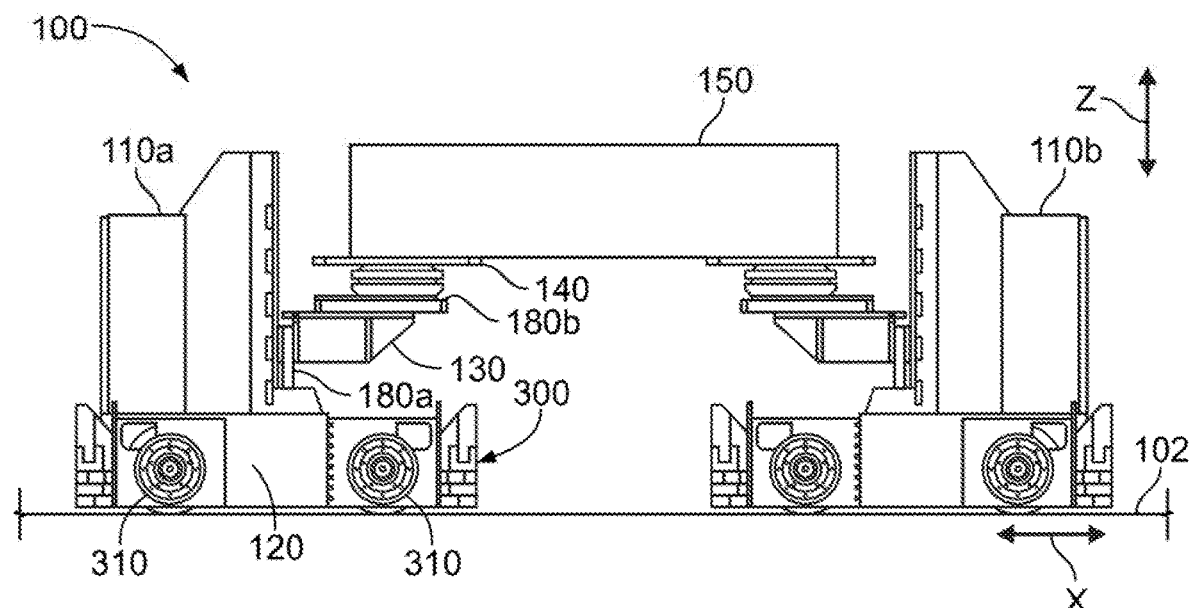
FIG. 1 provides a schematic block view of a mobile fixture system, according to an embodiment of the present disclosure.
Figure 2:
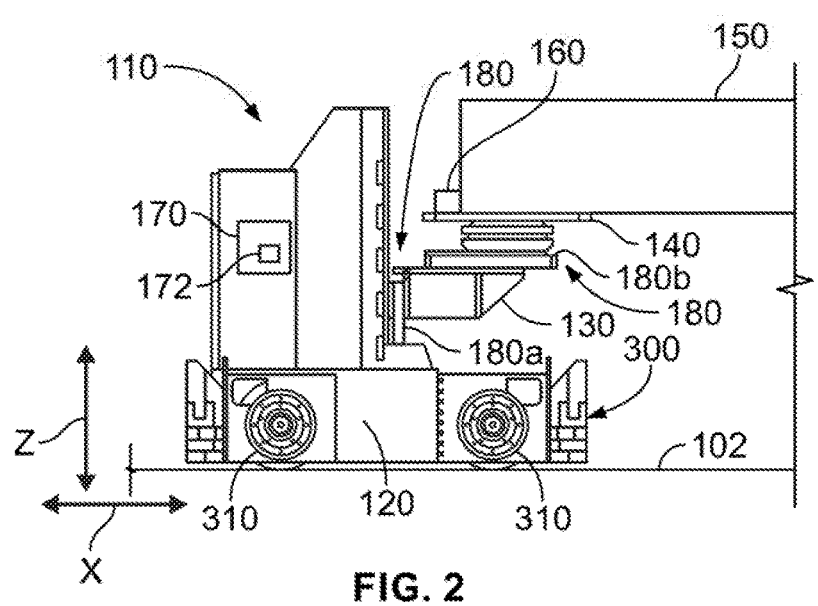
FIG. 2 provides a schematic block view of a mobile fixture for the mobile fixture assembly of FIG. 1.

FIG. 1 provides a schematic block diagram of a mobile fixture system 100, and FIG. 2 provides a schematic block diagram of a mobile fixture 110 that may be used in conjunction with the mobile fixture system 100. In various embodiments, the mobile fixture system 100 includes plural mobile fixtures 110. For example, in the depicted example, the mobile fixture system 100 includes two mobile fixtures—a mobile fixture 110a and a mobile fixture 110b. While two mobile fixtures are depicted in FIG. 1 for clarity and ease of illustration, it may be noted that more mobile fixtures may be included as part of a mobile fixture system in various embodiments.

In the illustrated example, the mobile fixture 110a and mobile fixture 110b are configured to travel over a floor 102, with each attached to an attachment member 150. The attachment member 150 in various embodiments is a part or assembly being transported and/or processed during a manufacturing process. For example, the attachment member 150 may be portion of an aircraft fuselage that is processed while supported and held by the mobile fixture 110a and the mobile fixture 110b. The mobile fixture 110a and mobile fixture 110b may be used to transport the portion of the fuselage to a location where portion is joined to other fuselage portions, and/or used to support or position the fuselage portion during a joining process.

As seen in FIG. 2, the depicted mobile fixture 110 (which may be used, for example, as mobile fixture 110a or mobile fixture 110b in FIG. 1) includes a movable base 120, a support platform 130, an adaptor interface 140, at least one sensor 160, and a controller 170. Generally, the adaptor interface 140 is used to couple the mobile fixture 110 to the attachment member 150, and the sensor 160 used to detect forces acting upon and/or movements of the attachment member 150. Responsive to the detected forces and/or movements, the controller 170 controls one or more aspects of the mobile fixture 110 to respond to or account for the detected forces and/or movements (e.g., the controller 170 articulates the support platform 130 and/or movable base 120 to translate the mobile fixture 110).

The movable base 120 is configured to travel over a floor 102. The movable base 120 may include, by way of example, one or more of wheels, tracks, or runners to facilitate movement over the floor 102. With reference to FIG. 1, the movable base 120 in various embodiments is configured to translate in lateral directions x and y (where y is into or out of the page) over the floor. The movable base 120 in various embodiments may be configured for holonomic motion over the floor 102.

Figure 3:
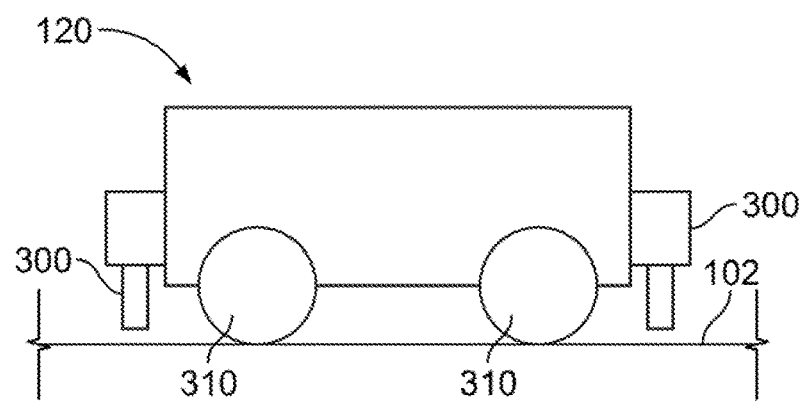
FIG. 3 provides a schematic side view of an example movable base that includes jacks in accordance with an embodiment of the present disclosure.

In some embodiments, the movable base 120 may include jacks or other components configured to secure the movable base 120 in place along the floor 120. FIG. 3 provides a schematic side view of an example movable base 120 that includes jacks 300 in accordance with various embodiments. The movable base 120 depicted in FIG. 3 also includes wheels 310 that are configured to translate over the floor 102. The jacks 300 are configured to engage the floor 102 to maintain the movable base 120 in a fixed position relative to the floor 102. When the jacks 300 are activated and engaged with the floor 102, the wheels 310 are lifted from the floor 102 and the movable base 120 is secured in place on the floor 102. In such a position or configuration, the movable base 120 does not move along the floor 102. When the jacks 300 are deactivated and not engaged with the floor 102, the wheels 310 contact the floor 102 and may be used (e.g., driven by a motor responsive to commands from the controller 170) to translate the movable base 120 along the floor 102. The jacks 300 are shown deactivated in FIG. 3, with the wheels 310 contacting the floor 102.

The jacks 300 and wheels 310 (e.g., motors that drive the wheels) may be controlled using command signals from the controller 170. In various embodiments, for example, the controller 170 is configured to disengage the jacks 300 from the floor 102 to move the movable base 120 from a fixed configuration (where the movable base 120 does not move along the floor 102) to a movable configuration (where the movable base 120 may be moved along the floor 102) responsive to a detected at least one of a force or movement detected by the sensor 160 that results from an interaction between the adaptor interface 140 and the attachment member 150. For example, if a lateral force is detected having a sufficient magnitude to indicate an approaching risk of tipping over of the mobile fixture 110 when the mobile fixture 112 is in the fixed configuration, the controller 170 may disengage the jacks 300 and actuate the wheels 302 to move the movable base 120 in an appropriate direction to address the applied force (e.g., move the mobile fixture 110 in the direction of the force. Additionally or alternatively to one or more jacks, one or more locking mechanisms may be used in connection with the wheels to place the mobile fixture 110 in the fixed configuration. It may be noted that high-speed jacks and/or high-torque wheels may be used in various embodiments, for example to allow for quick transitions from a fixed configuration to a mobile configuration. Further still, in various embodiments, a switch from a fixed configuration to a movable configuration (e.g., from jacks to wheels) may be triggered via a button or other manual input provided by an operator.

Returning to FIG. 2, the depicted support platform 130 is coupled to the movable base 120 and is articulable with respect to the movable base 120. For example, with reference to FIG. 1, the support platform 130 may be movable with respect to the movable base in the z-direction. In some embodiments, the support platform 130 may be coupled to a tower or other structure coupled to the movable base 120, with the support platform traversing the z-direction along the tower. Additionally or alternatively, the support platform 130 may be articulable in the x and/or y directions with respect to the movable base 120.

Figure 4:
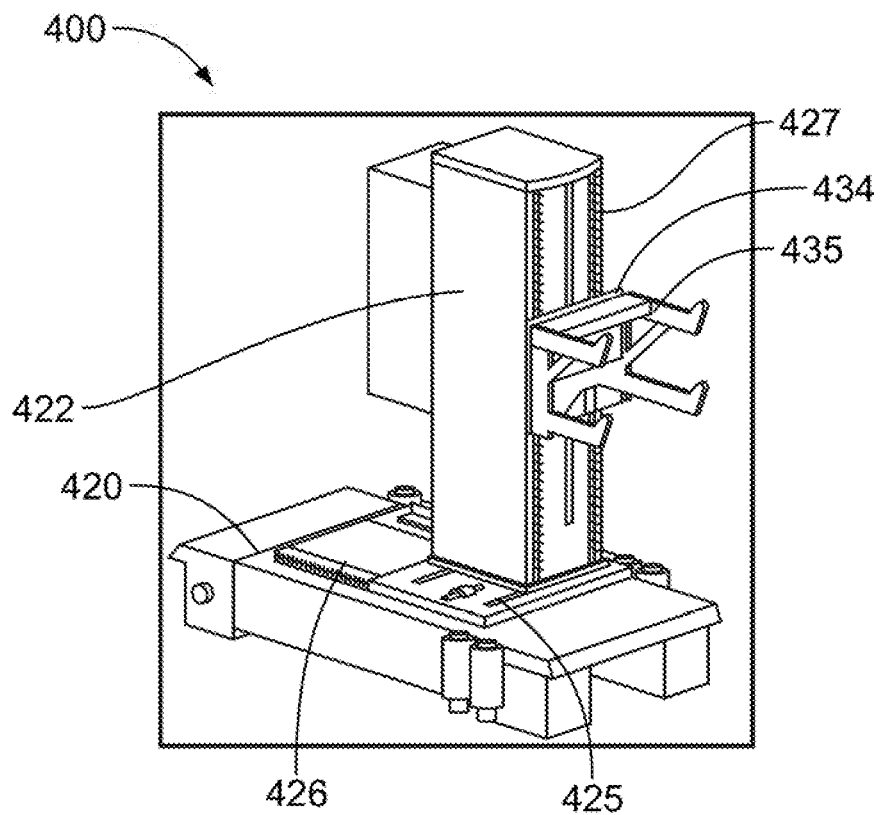
FIG. 4 provides a schematic perspective view of a mobile fixture formed in accordance with various embodiments.
Figure 5:
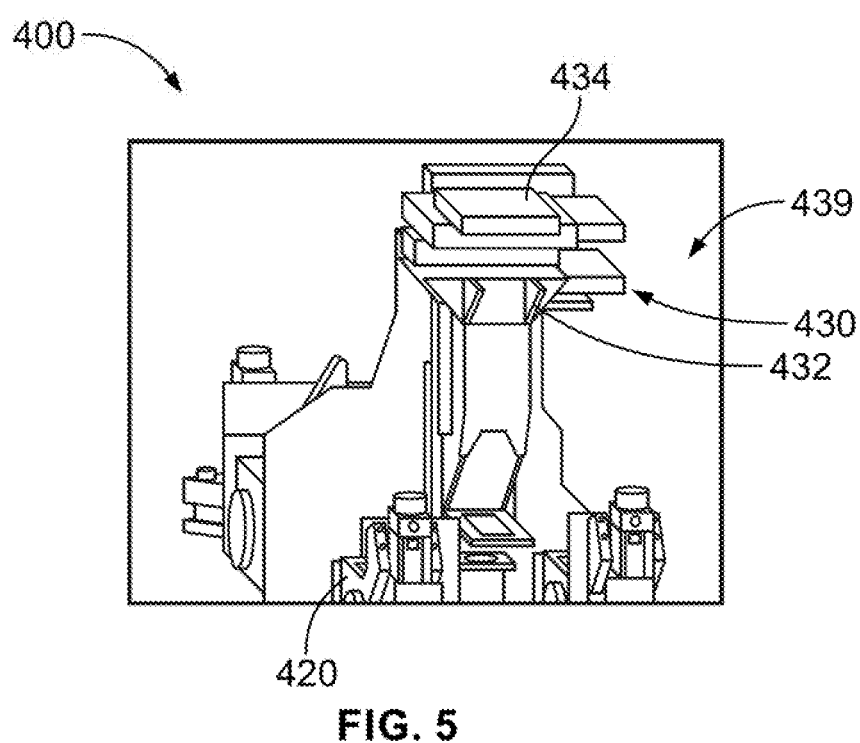
FIG. 5 provides a schematic perspective view of a mobile fixture formed in accordance with various embodiments.

FIGS. 4 and 5 illustrate example mobile fixtures 400 formed in accordance with various embodiments, showing examples of types of movements or articulations provided by or between a support platform and a base in various embodiments. FIG. 4 provides a schematic perspective view of a mobile fixture 400 including a movable base 420, and support platform 430, and FIG. 5 provides a view of the mobile fixture 400 including a mounting plate 434. It may be noted that the mounting plate 434 is not shown in FIG. 4. The mobile fixture 400 may incorporate one or more aspects of the mobile fixture 110 discussed herein, and provides an example of a mobile fixture 110. The depicted mobile fixture 400 provides an omnidirectional robot that is configured to utilize a tower 422 to lift, support, and/or position, for example, a part or assembly. The tower 422 (e.g., via mounting plate 434) is configured to interface with a dedicated tool for locating and supporting a perimeter, edge, or other portion of the part or assembly.

As seen in FIG. 4, the movable base 420 is located at the bottom of the mobile fixture 400, and houses one or more components configured to house components for moving the movable base along one or more of the $x_0$, $y_0$, and $z_0$ directions (e.g., wheels for movement along the $x_0$ and $y_0$ directions, jacks for movement along the $z_0$ direction). The movable base 420 in various embodiments is provided to provide omnidirectional movement as well as stability to the mobile fixture 400.

The depicted mobile fixture 400 includes a tower 422 mounted to the movable base 420. The depicted movable base 420 includes rails 425, 426 to allow lateral movement of the tower 422 with respect to the movable base 420, and vertical rails 427 to allow elevational or vertical movement of the tower 422 with respect to the movable base 420. Accordingly, the tower 422 may move with respect to the movable base 420 along the x1 and/or y1 directions, and the support platform 430 may move with respect to the tower 422 (and movable base 420) in the z1 direction. In other embodiments, the tower 422 may be fixed to the movable base 420 such that only the movement along the vertical rails 427 is provided via the tower 422.

The depicted support platform 430 includes a support frame 432 and a mounting plate 434. The depicted support frame 432 is coupled to the tower 422 along the vertical rails 427, and configured to move up and down along the tower 422 via the vertical rails 427. The mounting plate 434 in the example of FIG. 5 is coupled to the support frame 432, and disposed above and supported by the support frame 432. Generally, the mounting plate 434 is configured to be coupled to an assembly or part being held by the mobile fixture (either directly or indirectly). For the example depicted in FIG. 4, the mounting plate 434 is vertically oriented and mounted to the tower 422, with a tool adaptor 435 mounted to the mounting plate 434. The tool adaptor 435 of the example of FIG. 4 includes four arms or shelves that extend horizontally and are configured to interact or cooperate with the attachment member to secure the attachment member to the tool adaptor 435. The mounting plate 434 in various embodiments is movable in the $x_1$ and $y_1$ directions with respect to the support frame 432 (which in turn is movable in the $z_1$ direction with respect to the tower 422). For example, the mounting plate 434 may be mounted to the support frame 432 via one or more of pins, tracks, slides, grooves, threaded rods or the like that allow motion between the mounting plate 434 and the support platform 432. Alternatively or additionally, the mounting plate 434 may be able to rotate (e.g., about a z-axis) with respect to the support frame 432. The mounting plate 434 in turn may have mounted thereto a tool adaptor (e.g., adaptor interface 140 or a portion thereof, not shown in FIG. 5) that couples to an assembly or part being held by the mobile fixture 400. The support platform 430, along with sensor and/or actuator subsystems (not shown in FIG. 5) may be referred to as an end effector 439. The end effector 439 is configured as an upper portion of the mobile fixture 400 that defines the precise movement and positioning of the mounting plate 434.

Returning to FIG. 2, the depicted adaptor interface 140 is coupled to and moves with the support platform 130. In some embodiments, the adaptor interface 140 may be fixedly mounted to the support platform 130, while in other embodiments the adaptor interface 140 may be capable of additional movement independent of the support platform 130. The adaptor interface 140 is configured to mechanically interface with the attachment member 150. For example, the adaptor interface 140 may include one or more jaws that grasp or otherwise secure the attachment member 150 to the adaptor interface 140. As additional example, one or more fasteners may be used to couple the attachment member 150 to the adaptor interface 140, or the adaptor interface 140 may include a magnet for coupling to a metallic attachment member 150. Generally, the adaptor interface 140 is configured to releasably secure the attachment member 150 to the mobile fixture 110. For example, after a part or assembly no longer requires support or positioning from the mobile fixture 110, the adaptor interface 140 may release the attachment member 150. It may be noted that the adaptor interface 140, while depicted as a single block in FIG. 2, may include more than one physical portion in various embodiments. For example, in some embodiments, the adaptor interface 140 may include both a mounting plate (that couples to the mobile fixture) and a tool adaptor, with the tool adaptor coupled to the mounting plate and the attachment member 150. In other embodiments, the mounting plate may have an interface integrally designed or fabricated on to the mounting plate, making the tool adaptor either optional or unnecessary (e.g., depending on what type of attachment member were being handled by the mobile fixture 110).

As best seen in FIG. 1, in various embodiments, each of the mobile fixtures (e.g., mobile fixture 110a and mobile fixture 110b) is configured to concurrently engage a different portion of the attachment member via a corresponding adaptor interface (e.g., adaptor interface 140a of mobile fixture 110a, and adaptor interface 140b of mobile fixture 110b). Accordingly, the mobile fixtures 110a, 110b are operably coupled to each other via the attachment member 150.

With continued reference to FIG. 2, the mobile fixture 110 includes a sensor 160. In various embodiments, the mobile fixture 110 includes multiple sensors. The depicted sensor 160 is coupled to the adaptor interface 140, and is configured to detect at least one of a force or movement resulting from an interaction between the adaptor interface 140 and the attachment member 150. For example, when the adaptor interface 140 is coupled to the attachment member 150, any movement (or attempted movement) of the attachment member 150, or any force applied to the attachment member 150, will result in a corresponding movement or force on the adaptor interface 140 due to an interaction between the attachment member 150 and the adaptor interface 140, as they are coupled (e.g., physically attached or mechanically coupled). In the illustrated embodiment, the sensor 160 communicates any detected forces and/or motions to the controller 170. Additionally, in various embodiments, sensors may be utilized that localize one or more mobile fixtures within a world frame and/or with respect to one or more other mobile fixtures may be utilized to provide feedback to the controller 170.

Various different types of sensor may be used. For example, a force and/or torque sensor may be used. As another example, a tilt sensor may be employed. As another example, in embodiments where a motor is employed to actuate the support platform 130 or aspect thereof, an axis encoder (e.g., servo feedback encoder or other rotary encoder, angle encoder) may be employed. Linear encoders may also be utilized in various embodiments. It may be noted that in various embodiments, the sensor 160 may be associated with an actuator, such as an encoder that is associated with a motor. The use of force sensor, load sensor, torque sensor, axis encoder, accelerometer, and/or tilt sensor in various embodiments provide for reliable, convenient detection of forces and movements resulting from the interaction between the adaptor interface 140 and the attachment member 150.

The controller 170 of the illustrated example is operably coupled to the movable base 120, to the support platform 130, and to the sensor 160. For example, the controller 170 may be coupled to one or more sensors 160 via one or more corresponding wires, cables, or other communicative pathway to receive information from the one or more sensors 160. As another example, the controller 170 may be coupled to the movable base 120 and support platform 130 via communicative pathways to corresponding actuators (e.g., end effector actuator 180) coupled to the movable base 120 and support platform 130, with the controller 170 providing control signals to the actuators to translate the movable base 120 and/or support platform 130 (or aspects thereof such as mounting plate 434). It may be noted that the controller 170 may be mounted to the movable base 120 or to the support platform 130 in various embodiments. Alternatively, the controller 170 may be mounted elsewhere, such as in remote or detachable unit. It may further be noted that in some embodiments, the controller 170 may include multiple controller portions that are physically separate units.

The depicted controller 170 is configured (e.g., programmed) to control movement of at least one of the movable base 120 or support platform 130 responsive to the at least one of the force or movement detected by the sensor 160 (or sensors 160). For example, after receiving information describing a force acting on the adaptor interface 140, the controller may determine, based on a direction of the force, a direction in which to move adaptor interface 140 by moving one or both of the movable base 120 or support platform 130. For example, the controller may determine a control action so that the adaptor interface 140 moves in a direction to reduce or alleviate the force acting on the adaptor interface 140 (e.g., to move the adaptor interface in the direction in which the applied force is urging the adaptor interface. The amount of the movement may be determined based on the magnitude of the detected force, and/or based on ongoing detection of the determined force (e.g., the adaptor interface 140 is moved until the force is zero or falls beneath a threshold of acceptable or tolerable force on the adaptor interface 140). The determined control signal may then be communicated to actuators (e.g., end effector actuator 180) for articulating the movable base 120 and/or support platform 130. In some embodiments, the controller 170 is configured to articulate the adaptor interface 140 (e.g., via movement of the movable base 120 and/or support platform 130) responsive to a detected force satisfying a threshold. By using a threshold force value, unnecessary movements may be avoided that would otherwise be caused by insubstantial forces impacting the adaptor interface 140.

It may be noted that the controller 170, while depicted as a single physical unit for ease of illustration, may include multiple physical units or devices in various embodiments. In various embodiments the controller 170 includes processing circuitry configured to perform one or more tasks, functions, or steps discussed herein. As also discussed above, it may be noted that "processing unit" as used herein is not intended to necessarily be limited to a single processor or computer. For example, the controller 170 may include multiple processors, ASIC's, FPGA's, and/or computers, which may be integrated in a common housing or unit, or which may distributed among various units or housings. It may be noted that operations performed by the controller 170 (e.g., operations corresponding to process flows or methods discussed herein, or aspects thereof) may be sufficiently complex that the operations may not be performed by a human being within a reasonable time period. In the illustrated embodiment, the controller 170 includes a tangible, non-transitory memory 172 for storage of, among other things, instructions for causing the controller 170 to perform one or more steps or tasks discussed herein.

It may be noted that in various embodiments, the controller 170 may not be used for supervisory control and/or may not connected to a network. For example, the controller 170 in various embodiments is configured to autonomously (e.g., perform automatically without human intervention or communication from any other mobile fixture) control movement of at least one of the movable base 120 or support platform 130 responsive to the detected at least one of a force or movement associated with the movement of the attachment member 150. Accordingly, the controller 170 may coordinate movement of the attachment member 150 along with at least one other mobile fixture. For example, with reference to FIG. 1, the mobile fixture 110a and mobile fixture 110b may be communicatively isolated from each other (e.g., not configured to communicate information therebetween). The mobile fixture 110a may be moved in a given direction (e.g., in a predetermined direction along which the attachment member 150 is to be moved as part of a processing and/or transportation process, for example to position the attachment member 150 in a new position for an additional processing step, and/or to move the attachment member 150 to a new location), resulting in an associated force on the attachment member 150 which is detected by mobile fixture 110b (e.g., by one or more sensors of mobile fixture 110b). A controller of mobile fixture 110b then controls (without any communicated command signals from mobile fixture 110a) the movable base or support platform of the mobile fixture 110b to move responsive to the force (e.g., in the same direction that the force is detected as imposing on an adaptor interface of the mobile fixture 110b).

Accordingly, the movement of the mobile fixture 110a, attachment member 150, and mobile fixture 110b may be coordinated to move in a common direction at a common velocity, without any communication between the mobile fixture 110a and mobile fixture 110b. By having one or mobile fixtures that control movement of the adaptor interface 140 (via movement of the movable base 120 and/or support platform 130) without any input or intervention from other mobile fixtures, various embodiments avoid the complexity required to have multiple units all wired together or joined to a central network that has to plan and provide coordinated control commands to all of the units. Accordingly, both planning and implementation of movements of the attachment member 150 may be simplified, and made more efficient and reliable.

Figure 6:
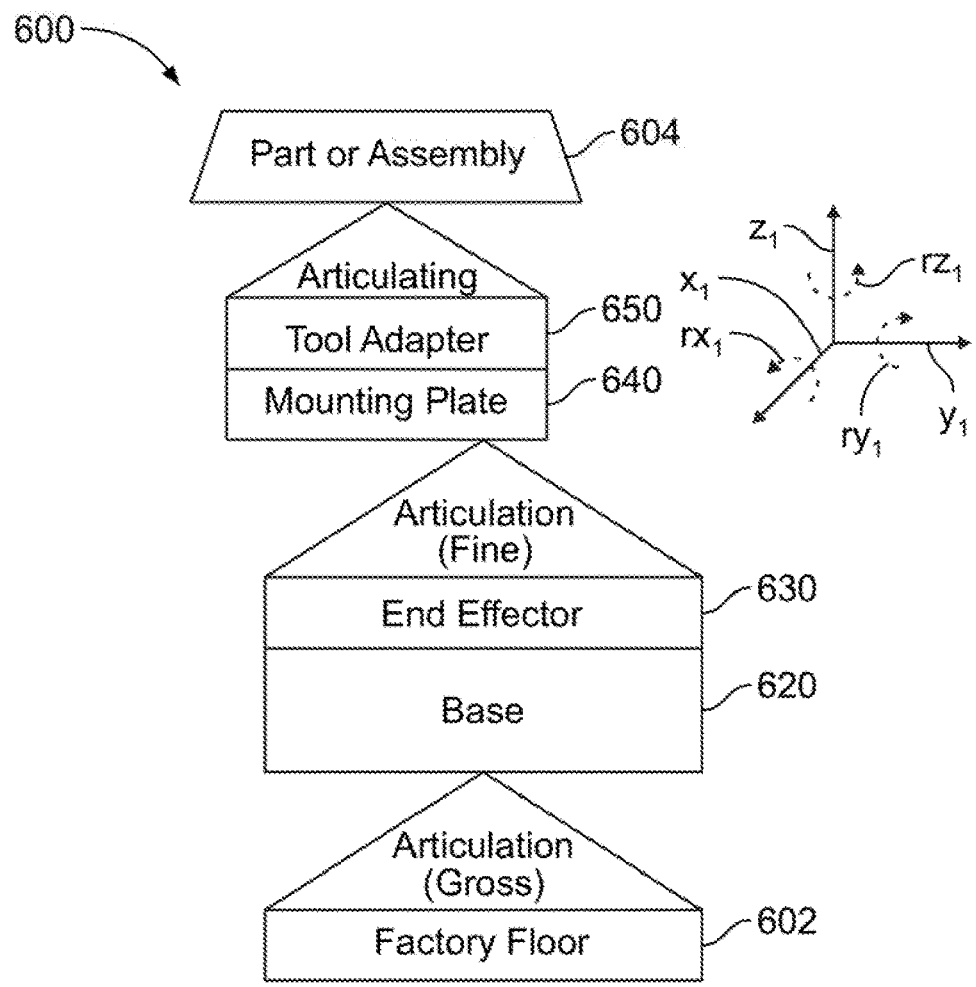
FIG. 6 provides a schematic view of a mobile fixture, according to an embodiment of the present disclosure.

FIG. 6 provides a schematic block view of a mobile fixture 600 formed in accordance with various embodiments. The mobile fixture 600 in various embodiments incorporates and/or represents one or more aspects of the mobile fixture 110 discussed herein. As seen in FIG. 6, the depicted example mobile fixture 600 includes a base 620, end effector 630, mounting plate 640, and tool adaptor 650. The mobile fixture 600 is disposed on a factory floor 602 and is configured to be coupled to a part or assembly 604.

The base 610 is configured to translate across the factory floor 602 to provide gross articulation of the mobile fixture 600. The base 610, for example, may include wheels and/or jacks. When the wheels are engaged, the base 610 may be controlled to move along the $x_1$, $y_1$, and $rz_1$ directions, but any movement along $rx_1$, $ry_1$, and $z_1$ are produced by floor topography. When the jacks are engaged, movement along $rx_1$, $ry_1$, and $rz_1$ may be controlled. In other embodiments, for example, wheels and jacks may be combined along with a fully-actuated, active suspension, allowing for movement in all directions.

The depicted end effector 630 is coupled to the base 620 and is configured to provide fine articulation of the mounting plate 640 with respect to the end effector 630 (and base 620). For example, the end effector may include one or more of mechanical rails, ballscrews, or linear actuators. In some embodiments, the motion between the mounting plate 640 and the end effector 630 may include controlled motion along the $x_1$, $y_1$, and $z_1$ directions, with floating motion along the $rz_1$ direction. In other embodiments, full six degree of freedom manipulators may be utilized providing controllable motion along all six dimensions depicted in the coordinate axes of FIG. 6.

In the illustrated example, the tool adaptor 650 is mounted to the mounting plate 640. The tool adaptor 650 is configured to grasp or otherwise be physically coupled to the part or assembly 604. In the illustrated embodiment, the tool adaptor 650 is configured to provide for some motion between the tool adaptor 650 and the part or assembly 604. For example, the tool adaptor 650 may include u-joints to provide floating rotational motion between the tool adaptor 650 and the part or assembly 604 along the $rx_1$ and $ry_1$ directions.

Returning to FIGS. 1 and 2, in various embodiments, the mobile fixture system 100 includes a lead mobile fixture and at least one follow mobile fixture. For example, in an illustrative example, the mobile fixture 110a may be configured as a lead mobile fixture and the mobile fixture 110b may be configured as a follow mobile fixture. The controller 170 of the lead mobile fixture 110a is configured to receive a movement command input, and to perform a movement of the attachment member responsive to the movement command input. The movement command input, for example, may include one or more control signals communicated to the controller 170 (e.g., via an input device dispose on the mobile fixture 110a that is configured to receive a control command from an external source, such as a keypad or joystick configured to receive a control command from a human operator, or a communication link (e.g., antenna) configured to receive an electronic control command from an off-board controller or processor). As another example, the movement command input may include a physical or manual input exerting a force on a portion of the lead mobile fixture 110a that is detected by one or more sensors 160 of the lead mobile fixture 110a. Responsive to the performed movement, the controller of the follow mobile fixture 110b autonomously (e.g., without human intervention or digitally or otherwise electrically communicated instruction) controls movement of the movable base 120 and/or support platform 130. For example, one or more sensors 160 of the follow mobile fixture 110b may detect a force imparted on the adaptor interface 140 of the follow mobile fixture 110b, and the controller 170 of the follow mobile fixture 110b may control its movement in response to the detected force. Accordingly, the movement of the follow mobile fixture 110b is coordinated with respect to the lead mobile fixture 110a, without the lead mobile fixture 110a communicating movement commands to the follow mobile fixture 110b (e.g., without communication of control signals to the controller 170 of the follow mobile fixture 110b).

It may be noted that in some embodiments, the mobile fixtures 110 are selectively switchable between being configured as the lead mobile fixture and being configured as a follow mobile fixture. Accordingly, one mobile fixture may act as the lead mobile fixture during one part of a process, while a different mobile fixture may act as the lead mobile fixture during a different part of the process. For example, an input device configured to receive an external movement command may be un-coupled from the mobile fixture 110a and coupled to the mobile fixture 110b to make the mobile fixture 110b the lead mobile fixture. As another example, an input device configured to receive an external movement command disposed on the mobile fixture 110a may be deactivated and an input device configured to receive an external movement command disposed on the mobile fixture 110b may be activated to make the mobile fixture 110b the lead mobile fixture.

Returning to FIG. 2, the depicted mobile fixture 110 includes an end effector actuator 180 interposed between the adaptor interface 140 and the movable base 120. The controller 170 is configured to articulate the adaptor interface 140 relative to the movable base via the end effector actuator 180. It may be noted that the end effector actuator 180 may articulate the adaptor interface 140 directly (e.g., by acting directly on the adaptor interface) or indirectly (e.g., by acting on the support platform 130 with the adaptor interface 140 moving with the support platform 130).

In the illustrated embodiment, the mobile fixture 110 includes two end effector actuators 180a and 180b. The end effector actuator 180a is interposed directly between the movable base 120 and the support platform 130, and movably couples the movable base 120 with the support platform 130. The end effector actuator 180b is interposed directly between the adaptor interface 140 and the support platform 130 (and indirectly between the adaptor interface 140 and the movable base 120) and movably couples the adaptor interface 140 with the support platform 130. For example, the movable base 120 may be controlled (e.g., via wheels driven by a motor) to provide gross articulation, while the end effector actuator 180a may be controlled to provide fine articulation of the support platform 130 with respect to the movable base. (It may be noted that while the end effector actuator 180a is illustrated as a single block for ease and clarity of illustration, the end effector actuator 180a in various embodiments may include plural components (e.g., motors, linear drives, wheels, corresponding rails or tracks) configured to actuate the support platform 130 in multiple directions with respect to the movable base 120. Further, in some embodiments, the end effector actuator 180b may be used to provide even further adjustment of the adaptor interface 140 with respect to the support platform 130.

Various different actuators may be employed in various embodiments. For example, motors may be used to drive wheels of the movable base 120. As additional examples, one or more of mechanical rails, ballscrews (e.g., driven by a motor), or linear actuators may be utilized to translate the support platform 130 relative to the movable base 120 and/or the adaptor interface 140 relative to the support platform 130.

Figure 7:
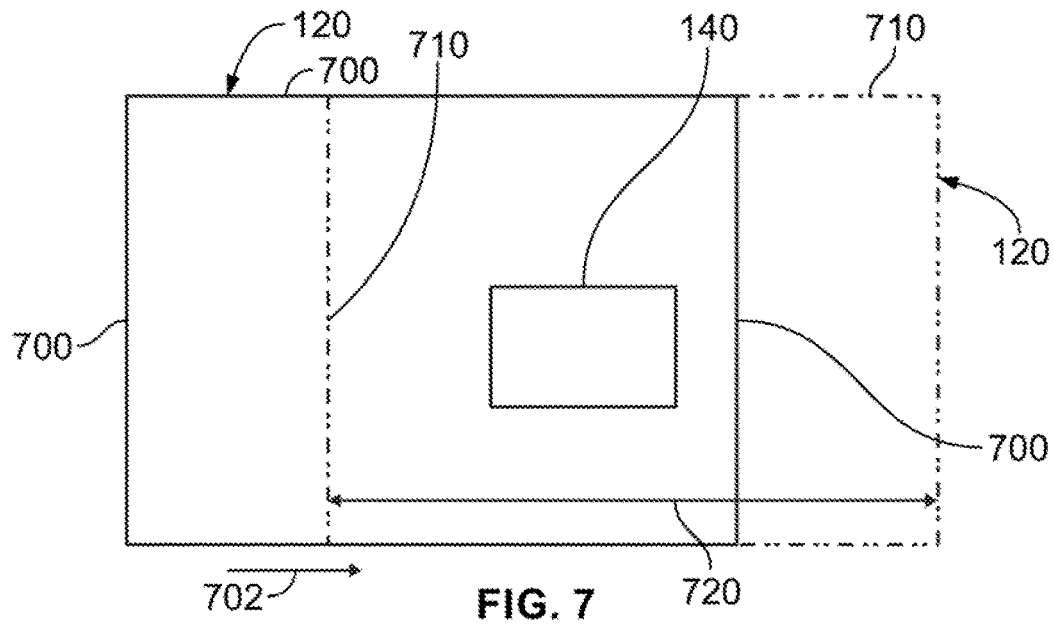
FIG. 7 schematically depicts centering of a movable base and adaptor interface with respect to each other, according to an embodiment of the present disclosure.

Various movements of the movable base 120 and support member 130 may be coordinated with each other. For example, in some embodiments, the controller 170 is configured to articulate the adaptor interface 140 relative to the movable base 120 responsive to the detected at least one force or movement, and to move the movable base 120 along the floor 102 responsive to the articulation of the adaptor interface 140. Based on the articulation of the adaptor interface 140, the controller 170 moves the movable base 120 (e.g., via control commands to one or more motors driving wheels of the movable base 120) to urge the movable base 120 toward a centered position with respect to the adaptor interface 140. For example, FIG. 7 schematically depicts an articulation of the movable base 120 and adaptor interface 140 with respect to each other. As seen in FIG. 7, the adaptor interface 140 and movable base 120 are in a first position 700 with both shown in solid lines. For example, the adaptor interface 140 has been articulated to the first position 700, which is not centered with respect to the movable base 120. A centered position may be understood as a position at which the adaptor interface is in a middle of one or more ranges of motion available to the adaptor interface 140 with respect to the movable base 120. Responsive to the motion by the adaptor interface 140, the controller 170 next articulates the movable base in direction 702 to the second position 710 (while also maintaining the adaptor interface 140 in the same position, with the movable base 120 and adaptor interface 140 accordingly moving relative to each other as the movable base 120 articulates from the first position 700 to the second position 710), with the movable base 120 shown in phantom lines at the second position 710.

At the second position 710, the movable base 120 is in a centered position, with the adaptor interface 140 disposed in the middle of an available range 720 representing the amount of movement available to the adaptor interface 140 relative to the movable base 120 along the direction 702. It may be noted that the available range 720 is shown for ease of illustration as sharing boundaries with the movable base 120; however, in practice the available range 720 may differ from the boundaries of the movable base 120. It may further be noted that the illustrative example discussed in connection with FIG. 7 depicts movement in only a single direction;

however, in various embodiments movement in multiple directions (e.g., one or more of lateral, vertical, or rotational) may be controlled to center the adaptor interface 140 with respect to the movable base 120. By controlling the movable base 120 to place the movable base in a centered position, various embodiments provide flexibility for movement in multiple directions and minimize risk of the adaptor interface 140 being positioned at an end of its available range with respect to the movable base 120, allowing movable base 120 and adaptor interface 140 to efficiently cooperate to provide gross articulation by the movable base 120 and fine articulation by the adaptor interface 140.

In various embodiments, the controller 170 is configured to selectively operate the mobile fixture 110 in a variety of modes. The controller 170 may be switched manually and/or autonomously between or among modes in various embodiments. For example, in some embodiments, the modes of operation in which the controller 170 operates the mobile fixture 110 include a carry mode, a stationary mode, and a compliance mode.

When in the carry mode, the controller 170 is configured to articulate the adaptor interface 140 relative to the movable base 120 (e.g., by moving the adaptor interface 140 relative to the support platform 130 and/or moving the support platform 130 relative to the movable base) responsive to the force or movement detected by the sensor 160, and to move the movable base 120 along the floor responsive to the articulation of the adaptor interface to urge the movable base 120 into a centered position with respect to the adaptor interface 140. (See FIG. 7 and related discussion.)

When in stationary mode, the controller 170 is configured to maintain the movable base in a fixed position relative to the floor 102. For example, the controller 170 may control jacks (e.g., jacks 300) to engage the floor 102 and lift wheels or tracks of the movable base 120 from the floor. In the stationary mode, the adaptor interface 140 may still be moved relative to the movable base 120 to re-position the attachment member 150 (e.g., vertically and/or a relatively smaller distance horizontally or laterally), but the movable base 120 is fixed in place relative to the floor 102. To move the mobile fixture 110, the jacks may be deactivated and the wheels placed in contact with the floor 102 and the controller 170 may leave the stationary mode and enter a different mode of operation. As another example, the controller 170 may actuate a locking mechanism that engages the floor 102 or other structure. For example, a pin may be advanced into an opening of tabs on the floor 102 or other structure to secure the mobile fixture 110 in a desired position. To move the mobile fixture, the pin may be retracted from the opening. The stationary mode may be utilized, for example, to provide increased stability during a manufacturing or assembly process when little or no lateral motion is required.

When in the compliance mode, the controller is configured to articulate the adaptor interface 140 responsive to a manual input. For example, a manual input in various embodiments may include the manual application of force to the adaptor interface in a desired direction. As another example, a manual input may include a command entered via a keypad, joystick, or other data entry device.

It may be noted that in various embodiments the controller 170 may be switched between modes manually and/or autonomously. For example, an operator may use a switch or keypad to place the controller 170 in a given mode. As another example, the controller 170 may autonomously switch modes, for example responsive to a type and/or amount of detected force. For example, the controller 170 in various embodiments autonomously removes the mobile fixture 110 from the stationary mode responsive to at least one of a detected force or movement satisfying a threshold. By way of example, a force threshold may be set such that the mobile fixture 110 is removed from the stationary mode to a different mode in which the movable base 120 may move along the floor 102 before a risk of tipping is encountered. As another example, a movement threshold may be set such that the mobile fixture 110 is removed from the stationary mode to a different mode allowing movement of the movable base 120 along the floor 102 when the adaptor interface 140 approaches within a predetermined range of a limit on its range of motion in a given direction. Accordingly, by switching the mobile fixture 110 autonomously from the stationary mode, the controller 170 helps to avoid damaging portions of the mobile fixture 110 and/or the attachment member 150.

Figure 8:
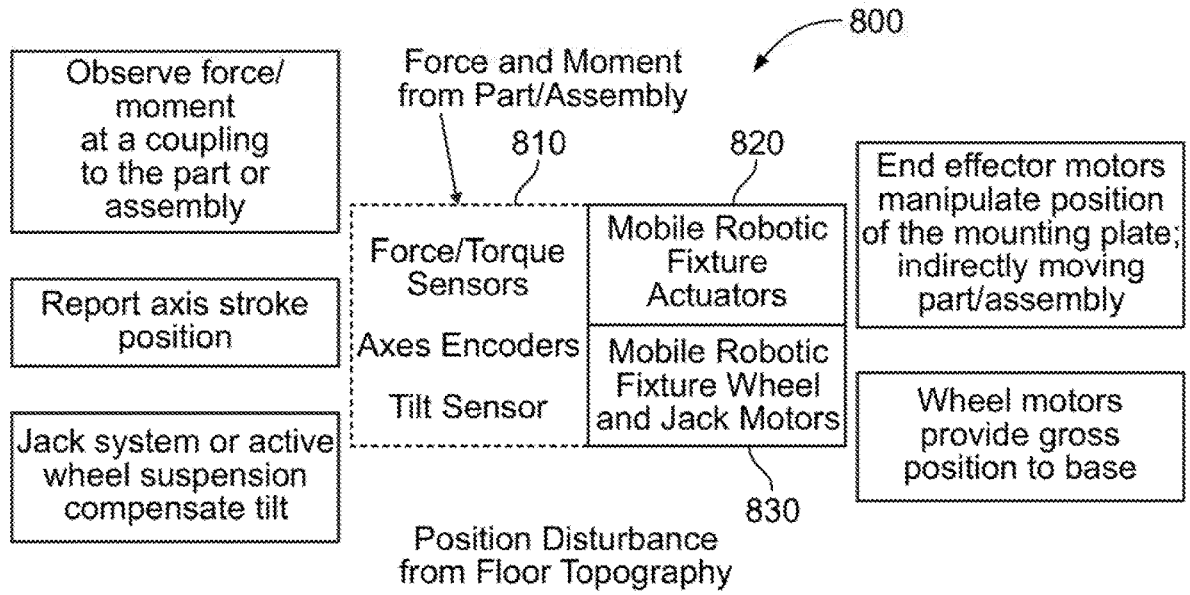
FIG. 8 schematically depicts control operations, according to an embodiment of the present disclosure FIG. 9 schematically depicts distributed control operations, according to an embodiment of the present disclosure.

FIG. 8 schematically depicts control systems aspects of a mobile fixture in accordance with various embodiments. A mobile fixture 800 (which may incorporate or represent one or more aspects of mobile fixture 110 includes sensors 810, robotic fixture actuators 820, and motors 830.

The sensors 810 generally detect a force and/or moment associated with a part or assembly being held by the mobile fixture 800. For example, force (or torque) sensors may detect a force (or moment) at a coupling to the part or assembly. As another example, axes encoders may detect an axis stroke position. As one more example, a jack system or active wheel suspension system may report a tilt (e.g., an angular deviation from a predetermined target position or orientation) and/or automatically compensate for a detected tilt.

The robotic fixture actuators 820 may include, for example, end effector motors that articulate a mounting plate or other aspect of a support platform and/or adaptor interface. The robotic fixture actuators 820, responsive to the receipt of information from one or more sensors (e.g., encoders), may actuate (e.g., under control of controller 170) to manipulate the position of a mounting plate. Because the part or assembly is physically or mechanically coupled to the mounting plate, the part or assembly is moved by the robotic fixture actuators 820 indirectly when the mounting plate is moved.

Figure 9:
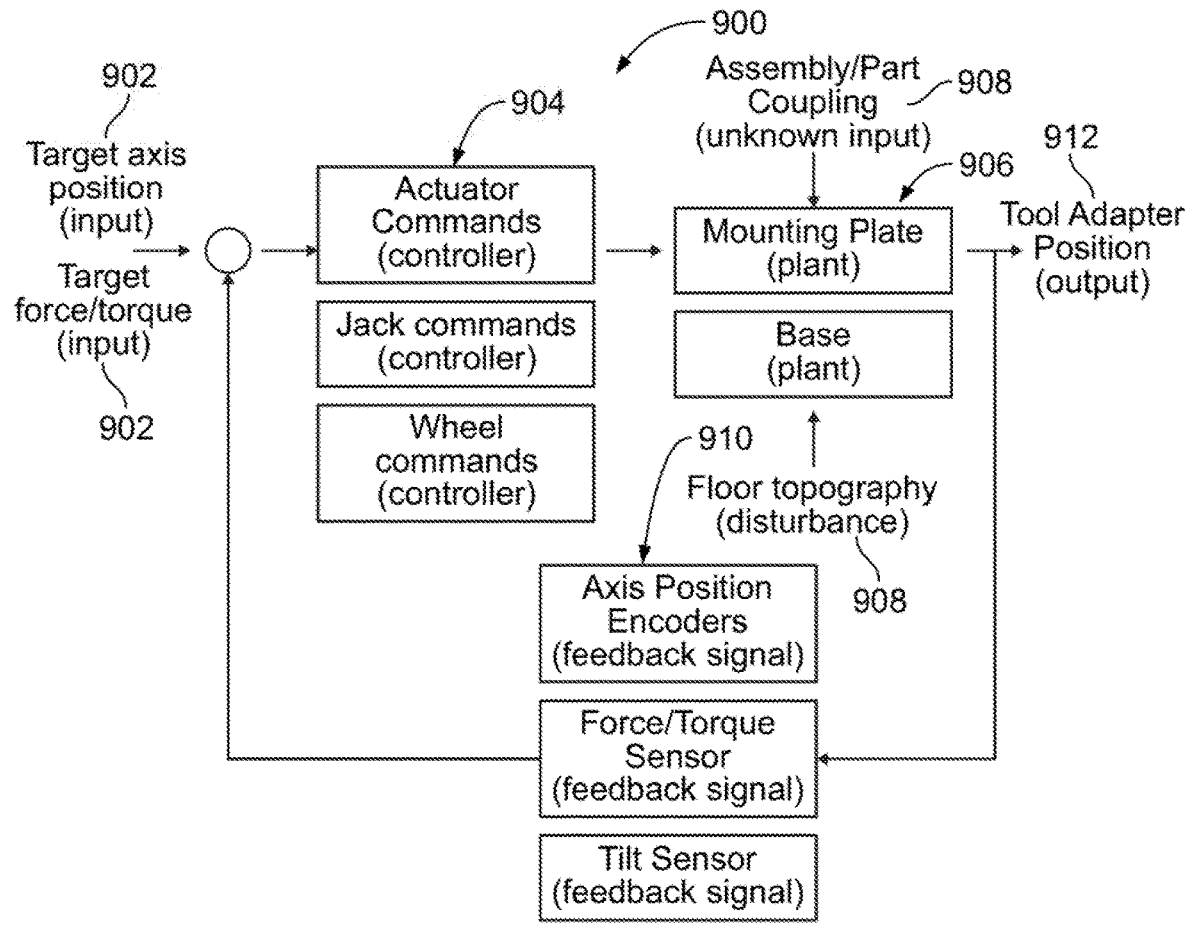

FIG. 9 schematically depicts distributed control aspects of a mobile fixture (e.g., mobile fixture 110) in accordance with various embodiments. FIG. 9 depicts a schematic representation of a distributed control strategy from the perspective of an individual mobile fixture. The control is distributed, for example, with the individual mobile fixture cooperating with other mobile fixtures to support and/or move an assembly or part, but with the individual mobile fixture responsible for its own control and not receiving (or providing) any communicated commands from other mobile fixtures.

In the example of FIG. 9, control commands are received by the control system 900. For example, control inputs 902 may include a target axis position and/or target force/torque. Based on the control inputs 902 (along with feedback information 910 that includes signals from one or more of axis position encoders, force/torque sensors, and/or tilt sensors), the control system 900 develops command signals 904 to actuate one or more aspects of the mobile fixture (e.g., actuator command, jack commands, or wheel commands) to articulate a movable base, support platform, and/or mounting plate.

The commands are then provided to the mounting plate and base in the illustrated embodiment at 906. Additionally, inputs 908 may be acquired related to the mounting plate and/or base. The inputs 908 represent physical interactions acting upon the mounting plate and/or base, for example due to the movement of a part or assembly to which the mounting plate is coupled, or due to topography of a floor that the base traverses. The controlled articulation of the mounting plate and/or base produces an output 912 in the form of a position of a tool adaptor that is mounted to the mounting plate (and, consequently, in the position of a part or assembly grasped by the tool adaptor).

Figure 10:
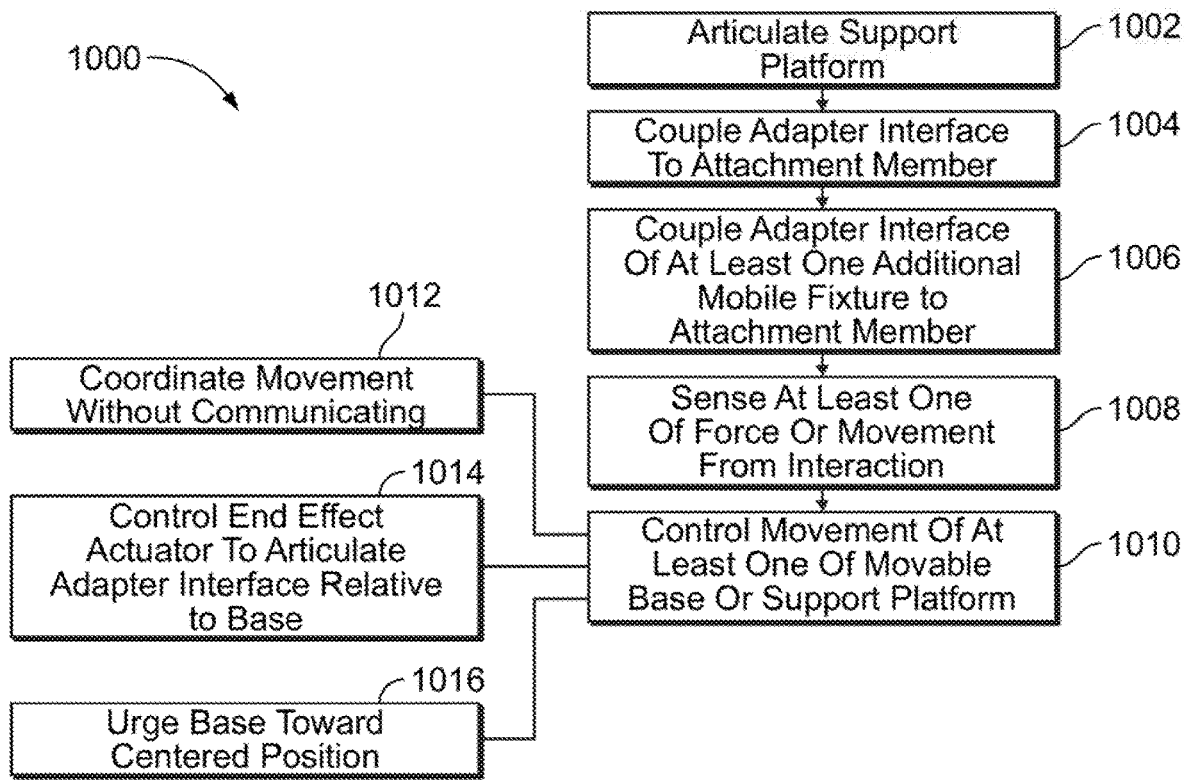
FIG. 10 illustrates a flow chart of a method, according to an embodiment of the present disclosure

FIG. 10 illustrates a flowchart of a method 1000. The operations of FIG. 10 may be implemented by one or more processors (e.g., controller 170) executing program instructions stored in memory (e.g., memory 172). The method 1000, for example, may employ structures or aspects of various embodiments (e.g., systems and/or methods) discussed herein, such as the system 100 and/or mobile fixture 110. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1000 may be used as one or more algorithms to direct hardware to perform one or more operations described herein.

At 1002, a support platform (e.g., support platform 130) of a mobile fixture (e.g., mobile fixture 110) is articulated with respect to a movable base (e.g., movable base 120) of the mobile fixture. For example, the support platform may be articulated to a desired position at which the mobile fixture will be used to grasp a part or assembly to support and/or position or transport the part or assembly.

At 1004, an adaptor interface (e.g., adaptor interface 140) of the mobile fixture is coupled to an attachment member (e.g., part or assembly to be held and/or transported by the mobile fixture). The adaptor interface is coupled to and moves with the support platform (which is in turn coupled to the movable base). The adaptor interface may also be configured for additional movement with respect to the support platform, for example to provide for fine adjustment of the position of the adaptor interface.

In some embodiments, multiple mobile fixtures may be utilized. For example, in the illustrated example, at 1006, an adaptor interface of at least one additional mobile fixture is coupled to the attachment member. The number of mobile fixtures utilized may be determined based on the size of the part or assembly and/or on the types of motions that the part or assembly will undertake while held by the mobile fixtures.

At 1008, at least one of a force or movement resulting from an interaction between the adaptor interface and the attachment member is sensed with a sensor (e.g., sensor 160). The at least one of the force or movement may be detected, for example, using at least one of a force sensor, torque sensor, axis encoder, or tilt sensor.

At 1010, movement of at least one of the movable base or support platform is controlled, with a controller (e.g., controller 170), responsive to the at least one of the force or movement detected by the at least one sensor. For example, the controller may determine a movement based on a detected force (e.g., determine a movement to move the movable base and/or support platform in a direction in which the detected force is acting to reduce or eliminate the detected force), and implement the determined movement via control signals to one or more actuators associated with the movable base and/or support platform.

As discussed herein, in various embodiments, multiple mobile fixtures are utilized. In the illustrated embodiment, at 1012, the movement of the support platform is controlled to coordinate movement between the mobile fixture and the attachment member to which it is coupled with movement of at least one additional mobile fixture coupled to the attachment member, without communicating commands to adjust the attachment member to the at least one additional mobile fixture.

The movement of the movable base and/or the support platform may be performed using an actuator such as a motor or drive. For example, in the illustrated embodiment, at 1014, an end effector actuator (e.g., end effector actuator 180) is controlled to articulate the adaptor interface relative to the movable base. In various embodiments, the end effector actuator is interposed between the adaptor interface and the movable base.

In some embodiments, the movable base and/or support platform are configured to help maintain the movable base at or near a centered position with respect to the adaptor interface. For example, in the illustrated embodiment, at 1016, after the adaptor interface is moved relative to the movable base responsive to the detected force or motion, the movable base is moved along the floor responsive to the articulation of the adaptor interface to urge the base toward a centered position with respect to the adaptor interface.

The mobile fixture may be operated under various modes of operation, with each mode of operation tailored for optimal performance of various tasks or under particular conditions to which the mobile fixture is subjected. For example, the mobile fixture may be selectively operated in one of at least three different modes. The modes include a carry mode (in which the adaptor interface is articulated responsive to a force or movement, and the movable base is moved along a floor responsive to the articulation of the adaptor interface to move the base into or toward a centered position with respect to the adaptor interface), stationary mode (in which the movable base is maintained in a fixed position relative to the floor), and compliance mode as discussed herein.

For example, in the compliance mode, the adaptor interface is articulated responsive to a manual input. It may be noted that, in addition to a manual input, the adaptor interface may also be articulated responsive to any detected force or movement. Further, in various embodiments, in the compliance mode, the adaptor interface is articulated responsive to a detected force that exceeds a minimum threshold. To illustrate, a person seeking to adjust a position of an attachment member relative to a support platform on which the attachment member is placed, in the compliance mode, may apply a force manually to the support platform in a given direction that exceeds a threshold of 10 pounds, for example. The applied force would be sensed by the sensor and provide an input to the controller for activating drive mechanisms to move the support platform for adjusting the position of the attachment member. In situations where an attachment member may be an aircraft structural assembly having a weight of hundreds of pounds, a minimal force manually applied to the support platform in the compliance mode would enable one to utilize the drive mechanisms to adjust the support platform and/or attachment member, without the user having to lift or support the weight of the attachment member.

In the stationary mode, the movable base is maintained in a fixed position, or fixed configuration, relative to the floor. In various embodiment, the mobile fixture may be autonomously moved from a fixed configuration to a movable configuration (e.g., where wheels contact the floor and translate the mobile fixture along the floor) responsive to a detected force or movement. For example, in some embodiments, the mobile fixture is autonomously moved from the stationary mode responsive to the detected force or movement satisfying a threshold (e.g., exceeding a force limit lower than a force required to tip the mobile fixture over).

Figure 11:
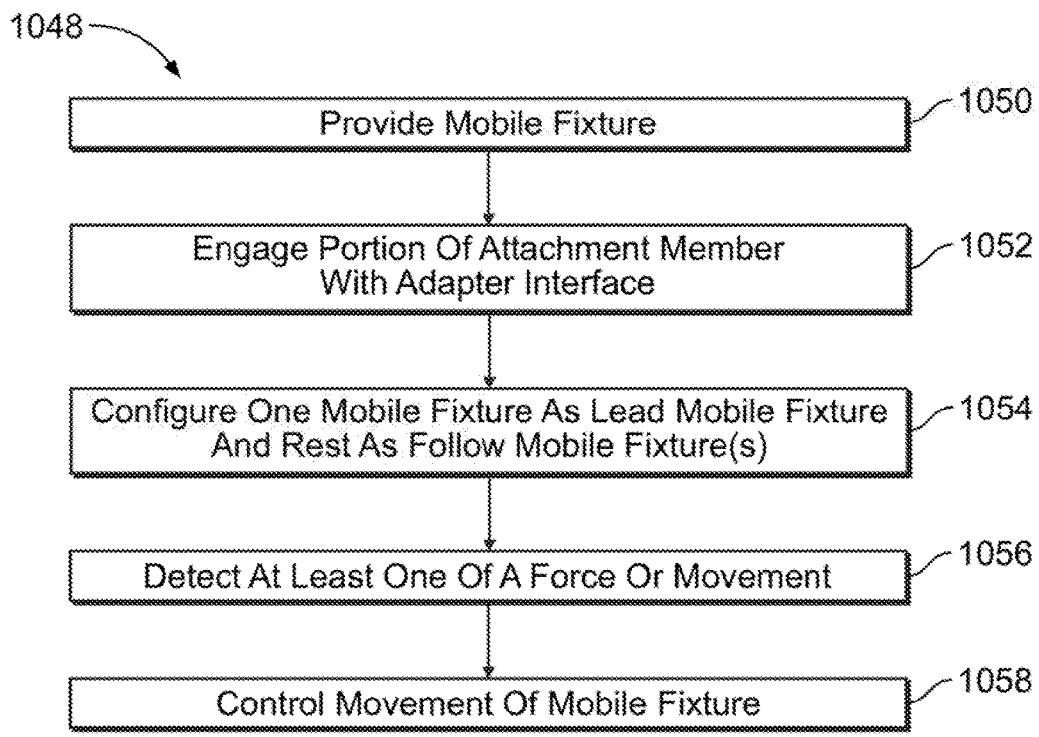
FIG. 11 illustrates a flow chart of a method, according to an embodiment of the present disclosure.

FIG. 11 illustrates a flowchart of a method 1048. The operations of FIG. 11 may be implemented by one or more processors (e.g., controller 170) executing program instructions stored in memory (e.g., memory 172). The method 1048, for example, may employ structures or aspects of various embodiments (e.g., systems and/or methods) discussed herein, such as the system 100 and/or mobile fixture 110 and/or method 1000). In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1048 may be used as one or more algorithms to direct hardware to perform one or more operations described herein.

At 1050 a mobile fixture (e.g., mobile fixture 110 including movable base 120, support platform 130, adaptor interface 140, sensor 160, and controller 170) is provided. The mobile fixture includes an adaptor interface (e.g., adaptor interface 140) that is configured to mechanically interface with an attachment member, and a controller (e.g., controller 170) that controls movement of the movable base and/or support platform responsive to a detected force or movement that results from an interaction between the adaptor interface and the attachment member. In some embodiments, plural mobile fixtures are provided.

At 1052, a portion of the attachment member is engaged by the adaptor interface. The attachment member is also engaged by one or more other mobile fixtures. In some embodiments, one mobile fixture is configured as a lead mobile fixture and the remaining mobile fixture (or fixtures) is configured as a follow mobile fixture (or follow mobile fixtures). For example, in the illustrated embodiment, at 1054, one mobile fixture is configured as a lead mobile fixture and the rest configured as follow mobile fixture(s). A movement command input may be received by the lead mobile fixture, which then performs a movement responsive to the movement command input, with the movement affecting the attachment member (e.g., moving the attachment member and/or imparting a force or torque upon the attachment member). The control of the follow mobile fixture(s) may then be autonomously controlled by the respective follow mobile fixture(s) responsive to the force or movement of the attachment member. Accordingly, the movement of the follow mobile fixture(s) are coordinated with lead mobile fixture without any movement commands being communicated to the follow mobile fixture(s).

At 1056, at least one of a force or movement resulting from a movement (including an attempted movement in various embodiments) of the attachment member is sensed (e.g., by sensor 160). At 1058, the movement of the mobile fixture (e.g., movable base and/or support platform) is controlled autonomously responsive to the force or movement detected at 1056. For example, as also discussed above, the movement detected by a follow mobile fixture may result from a control action implements by the lead mobile fixture.

Figure 12:
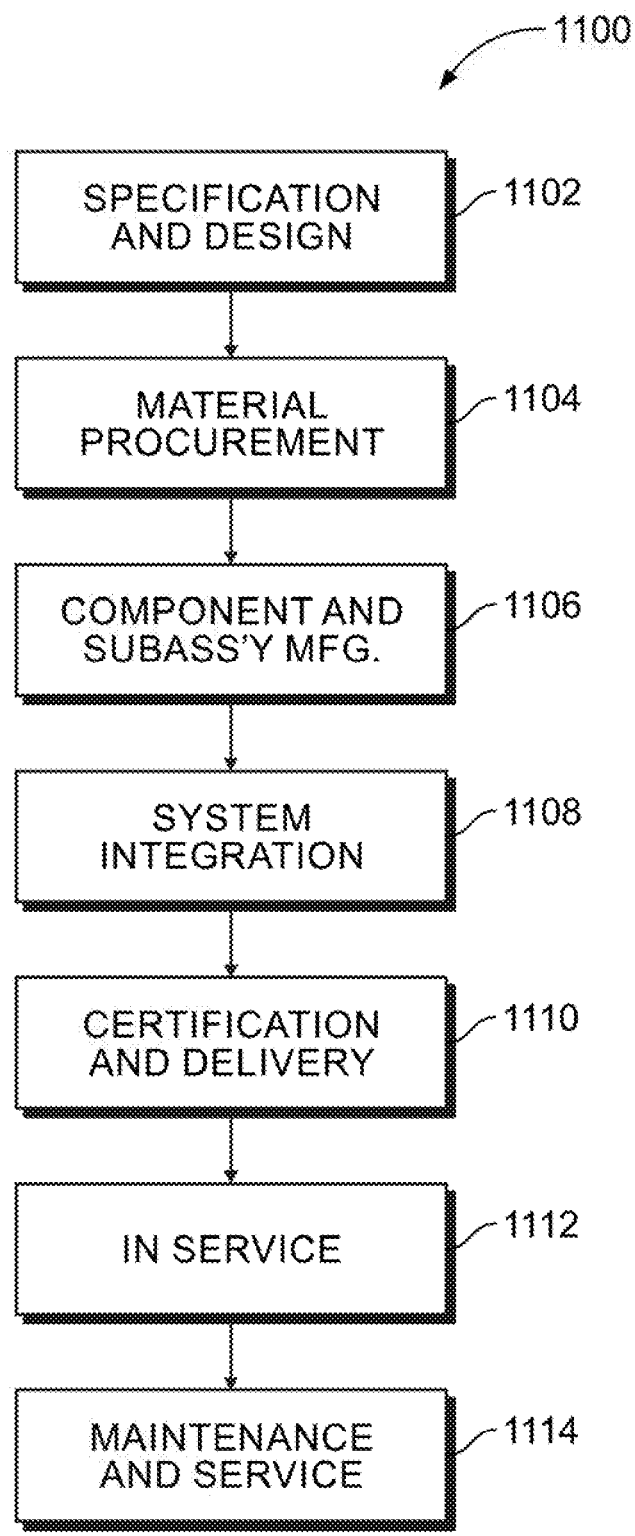
FIG. 12 is a block diagram of aircraft production and service methodology.
Figure 13:
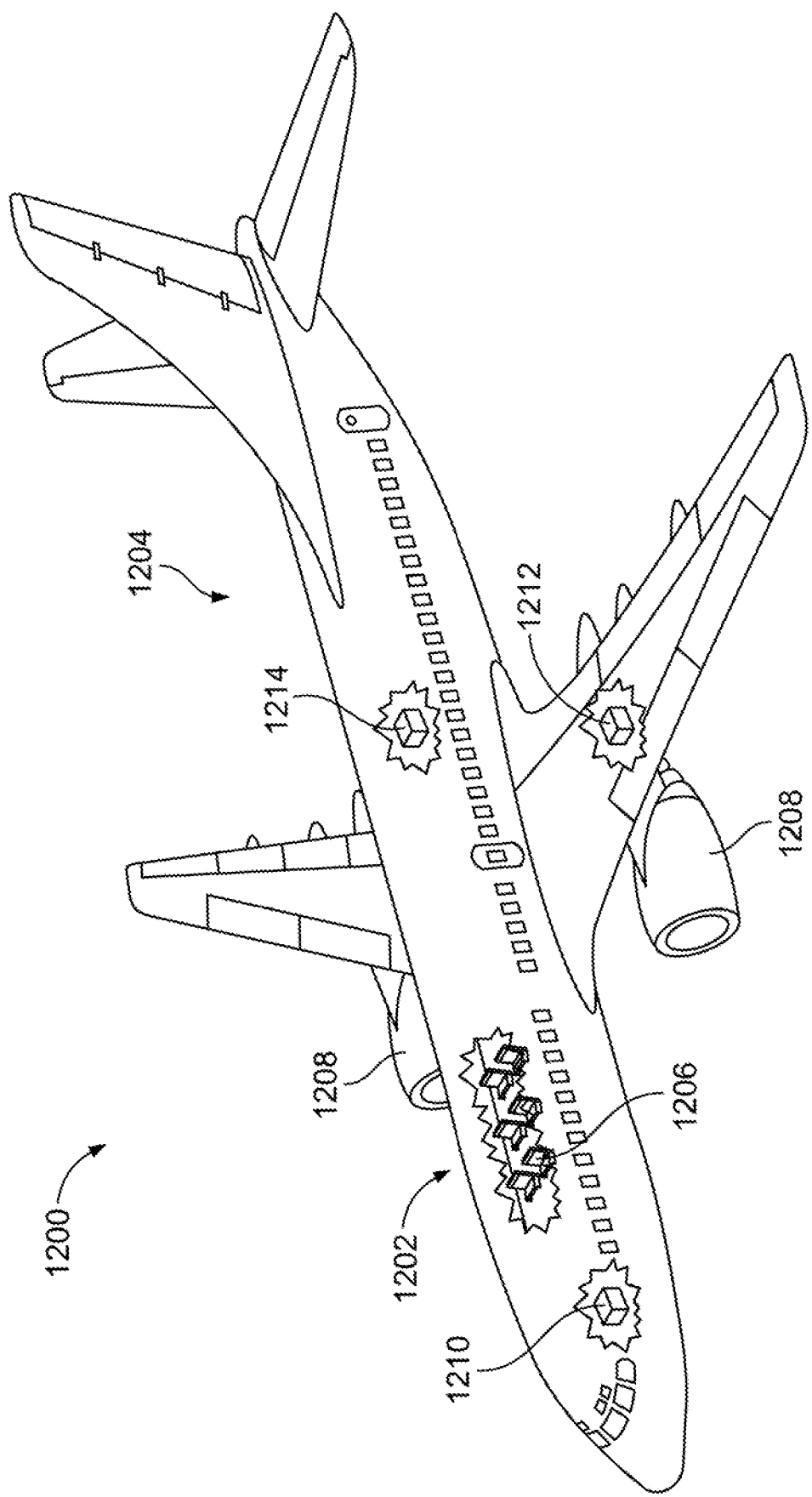
FIG. 13 is a schematic perspective view of an aircraft.

Examples of the disclosure may be described in the context of an aircraft manufacturing and service method 1100 as shown in FIG. 12 and an aircraft 1200 as shown in FIG. 13. During pre-production, illustrative method 1100 may include specification and design 1102 of the aircraft 1200 and material procurement 1104. During production, component and subassembly manufacturing 1106 and system integration 1108 of the aircraft 1200 take place. Thereafter, the aircraft 1200 may go through certification and delivery 1110 to be placed in service 1112. While in service by a customer, the aircraft 1200 is scheduled for routine maintenance and service 1114 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, the aircraft 1200 produced by the illustrative method 1100 may include an airframe 1202 with a plurality of high-level systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles of the invention may be applied to other industries, such as the automotive industry. Accordingly, in addition to aircraft 1200, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1106 may be fabricated or manufactured in a manner similar to components or subassemblies produced while the aircraft 1200 is in service. Also, one or more aspects of the apparatus, method, or combination thereof may be utilized during the production stages 1106 and 1108, for example, by substantially expediting assembly of or reducing the cost of an aircraft 1200. Similarly, one or more aspects of the apparatus or method realizations, or a combination thereof, may be utilized, for example and without limitation, while the aircraft 1200 is in service, e.g., maintenance and service 1114.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, a processing unit may be or include one or more processors that are configured to perform various tasks or operations described herein.

It may be noted that the processing unit 630 may be configured to execute a set of instructions that are stored in one or more data storage units or elements (such as one or more memories such as memory 632), in order to process data. The data storage units may also store data or other information as desired or needed. The data storage units may be in the form of an information source or a physical memory element within a processing machine.

The set of instructions may include various commands that instruct the processing unit 630 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the controller 170. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A mobile fixture controller configured to control operation of a mobile fixture, the movable fixture comprising a movable base configured to travel over a floor, a support platform coupled to the movable base and articulable with respect to the base, an adaptor interface coupled to and moving with the support platform, the adaptor interface configured to mechanically interface with an attachment member, and at least one sensor coupled to the adaptor interface; wherein
the mobile fixture controller is configured to be operably coupled to the movable base, support platform, and at least one sensor, the mobile fixture controller configured to:
receive an input from the at least one sensor corresponding to at least one of a force or movement resulting from an interaction between the adaptor interface and the attachment member;
determine a planned movement of at least one of the movable base or the support platform to address the detected at least one of the force or movement; and
control movement of the at least one of the movable base or support platform responsive to the at least one of the force or movement detected by the at least one sensor pursuant to the planned movement.

2. The mobile fixture controller of claim 1, wherein the mobile fixture controller is configured to autonomously control movement of at least one of the movable base or support platform responsive to the detected at least one force or movement that is associated with movement of the attachment member, to thereby coordinate movement of the attachment member along with at least one other mobile fixture supporting the attachment member, without the mobile fixture communicating movement commands to the at least one other mobile fixture.

3. The mobile fixture controller of claim 1, wherein the mobile fixture controller is configured to provide command signals to an end effector actuator interposed between the adaptor interface and the movable base to articulate the adaptor interface relative to the movable base via the end effector actuator.

4. The mobile fixture controller of claim 3, wherein the mobile fixture controller is configured to provide first command signals to articulate the adaptor interface relative to the movable base via the end effector actuator responsive to the detected at least one force or movement, and to provide second command signals to move the base along the floor responsive to the articulation of the adaptor interface to urge the base into a centered position with respect to the adaptor interface.

5. The mobile fixture of claim 1, wherein the mobile fixture controller is configured to move the movable base from a fixed to a movable configuration responsive to the detected at least one force or movement.

6. The mobile fixture controller of claim 1, wherein the controller is configured to selectively operate the mobile fixture in one of at least three modes including a carry mode, a stationary mode, and a compliance mode, wherein:
in the carry mode, the mobile fixture controller is configured to articulate the adaptor interface relative to the movable base responsive to the detected at least one force or movement, and to move the base along the floor responsive to the articulation of the adaptor interface to urge the base into a centered position with respect to the adaptor interface;
in the stationary mode, the mobile fixture controller is configured to maintain the movable base in a fixed position relative to the floor; and
in the compliance mode, the mobile fixture controller is configured to articulate the adaptor interface responsive to a manual input.

7. The mobile fixture controller of claim 6, wherein, in the compliance mode, the mobile fixture controller is configured to articulate the adaptor interface responsive to a detected force satisfying a threshold.

8. The mobile fixture controller of claim 6, wherein the mobile fixture controller is configured to autonomously remove the mobile fixture from the stationary mode responsive to at least one of a detected force or movement satisfying a threshold.

9. A method comprising:
articulating a support platform of a mobile fixture with respect to a movable base of the mobile fixture;
coupling an adaptor interface of the mobile fixture to an attachment member, the adaptor interface coupled to and moving with the support platform of the mobile fixture, the support platform coupled to the movable base of the mobile fixture;
sensing, with at least one sensor coupled to the adaptor interface, at least one of a force or movement resulting from an interaction between the adaptor interface and the attachment member; and
controlling, with a controller, movement of at least one of the movable base or support platform responsive to the at least one of the force or movement detected by the at least one sensor.

10. The method of claim 9, further comprising:
coupling an adaptor interface of at least one additional mobile fixture to the attachment member; and
controlling movement of the support platform of the mobile platform responsive to the detected at least one of the force or movement to coordinate movement of the mobile fixture and the attachment member with the at least one additional mobile fixture without communicating commands to adjust the attachment member to the at least one additional mobile fixture.

11. The method of claim 10, further comprising controlling an end effector actuator interposed between the adaptor interface and the movable base to articulate the adaptor interface relative to the movable base.

12. The method of claim 10, further comprising articulating the adaptor interface relative to the movable base responsive to the detected at least one force or movement, and moving the base along a floor responsive to the articulation of the adaptor interface to urge the base toward a centered position with respect to the adaptor interface.

13. The method of claim 10, further comprising autonomously moving the movable base from a fixed to a movable configuration responsive to the detected at least one force or movement.

14. The method of claim 10, wherein the at least one of the force or movement is detected using at least one of a force sensor, torque sensor, axis encoder, or tilt sensor.

15. The method of claim 10, further comprising selectively operating the mobile fixture in one of at least three modes including a carry mode, a stationary mode, and a compliance mode, wherein:
in the carry mode, the adaptor interface is articulated relative to the movable base responsive to the detected at least one force or movement, and the base is moved along a floor responsive to the articulation of the adaptor interface to urge the base into a centered position with respect to the adaptor interface;
in the stationary mode, the movable base is maintained in a fixed position relative to the floor; and
in the compliance mode, the adaptor interface is articulated responsive to a manual input.

16. The method of claim 15, wherein, in the compliance mode, the adaptor interface is articulated responsive to a detected force satisfying a threshold.

17. The method of claim 15, further comprising autonomously removing the mobile fixture from the stationary mode responsive to at least one of a detected force or movement satisfying a threshold.

\* \* \* \* \*